(12) United States Patent
Cantemir et al.

(10) Patent No.: US 12,081,075 B2
(45) Date of Patent: Sep. 3, 2024

(54) FULLY INTEGRATED ELECTRIC MACHINES AND RELATED TECHNOLOGY

(71) Applicants: Ohio State Innovation Foundation, Columbus, OH (US); Olivia Bruj, Columbus, OH (US)

(72) Inventors: Codrin Cantemir, Columbus, OH (US); Olivia Bruj, Cluj (RO)

(73) Assignees: Olivia Bruj, Cluj-Napoco (RO); OHIO STATE INNOVATION FOUNDATION, Columbus, OH (US)

( * ) Notice: Subject to any disclaimer, the term of this patent is extended or adjusted under 35 U.S.C. 154(b) by 296 days.

(21) Appl. No.: 17/461,956

(22) Filed: Aug. 30, 2021

(65) Prior Publication Data

US 2022/0069645 A1 Mar. 3, 2022

Related U.S. Application Data

(60) Provisional application No. 63/071,761, filed on Aug. 28, 2020.

(51) Int. Cl.

| | |
|---|---|
| *H02K 1/20* | (2006.01) |
| *H02K 1/16* | (2006.01) |
| *H02K 3/12* | (2006.01) |
| *H02K 3/24* | (2006.01) |
| *H02K 3/28* | (2006.01) |
| *H02K 3/48* | (2006.01) |
| *H02K 5/20* | (2006.01) |

(52) U.S. Cl.
CPC ............ *H02K 1/20* (2013.01); *H02K 1/165* (2013.01); *H02K 3/12* (2013.01); *H02K 3/24* (2013.01); *H02K 3/28* (2013.01); *H02K 3/48* (2013.01); *H02K 5/203* (2021.01)

(58) Field of Classification Search
CPC ............ H02K 1/187; H02K 1/20; H02K 3/04; H02K 3/12; H02K 3/14; H02K 3/24
See application file for complete search history.

(56) References Cited

U.S. PATENT DOCUMENTS

| | | | |
|---|---|---|---|
| 2,085,099 | A | 6/1937 | Jones |
| 6,979,927 | B2 | 12/2005 | Kometani et al. |
| 7,414,339 | B2 | 8/2008 | Kitamura et al. |
| 7,550,892 | B2 | 6/2009 | Hsu |
| 8,384,263 | B2 | 2/2013 | Hiramatsu et al. |
| 8,471,428 | B2 | 6/2013 | Naganawa et al. |
| 8,575,809 | B2 | 11/2013 | Stiesdal |
| 8,829,754 | B2 | 9/2014 | Miyata et al. |
| 10,044,236 | B2 | 8/2018 | Tamura |
| 10,277,085 | B2 | 4/2019 | Metz |
| 2014/0210298 | A1 | 7/2014 | Tamura |

(Continued)

FOREIGN PATENT DOCUMENTS

| | | | | |
|---|---|---|---|---|
| CN | 106411014 B | * | 5/2020 | ........... H02K 15/045 |
| EP | 2017854 A1 | | 1/2009 | |

OTHER PUBLICATIONS

Machine translation of CN-106411014-B (Year: 2020).*

(Continued)

*Primary Examiner* — Daniel C Puentes
*Assistant Examiner* — Minki Chang
(74) *Attorney, Agent, or Firm* — K&L Gates LLP

(57) ABSTRACT

Improved electric machines with tuned coils, integrated power electronics, and stator and rotor cooling assemblies.

20 Claims, 12 Drawing Sheets

(56) References Cited

U.S. PATENT DOCUMENTS

| | | | |
|---|---|---|---|
| 2014/0300223 A1 | 10/2014 | Yamada et al. | |
| 2014/0319953 A1 | 10/2014 | Rahman et al. | |
| 2016/0285338 A1 | 9/2016 | Huber et al. | |
| 2019/0300108 A1* | 10/2019 | David | H02K 15/0407 |
| 2021/0408855 A1* | 12/2021 | Islam | H02K 1/2766 |
| 2022/0352774 A1* | 11/2022 | Takahashi | H02K 1/2792 |
| 2023/0246534 A1* | 8/2023 | Stubsgaard | H02K 44/06 310/201 |

OTHER PUBLICATIONS

Ducreux et al., Analysis of Stator Leakage Reactance Computation with Finite Element Methods, 2015, IEEE, pp. 115-116 (Year: 2015).*

* cited by examiner

FULLY INTEGRATED ELECTRIC MACHINES AND RELATED TECHNOLOGY

CROSS-REFERENCE TO RELATED APPLICATION

This application claims priority to U.S. Provisional Patent Application No. 63/071,761 filed on Aug. 28, 2020, the entirety of which is incorporated herein by reference.

STATEMENT REGARDING FEDERALLY FUNDED RESEARCH

This invention was made with government support under Grant No. GRT000355440, 60045048 and Grant No. NNX14AL87A, both of which were awarded by the NASA Glenn Research Center. The government has certain rights in the invention.

BACKGROUND

An electric machine typically includes a rotor and a stator. In some designs, the stator includes a core about which a wire is wound to form a coil. The core may have a number of slots along its circumference, and each slot may receive several layers of the wire.

There are continued efforts aimed at increasing the power density and efficiency of electric machines. One major avenue for increasing power density is to increase the supply frequency. However, increasing the supply frequency may result in two types of parasitic effects known as the "Skin Effect" and the "Proximity Effect." These two effects are also highly dependent on the size and/or geometry of the electric machine as well. Typically, increasing the size of an electric machine could result in more negative outcomes associated with these parasitic effects. Some small size electric machines can use a Litz wire in order to minimize parasitic effects. However, using a Litz wire may be less suitable or less practical for electric machine designs that have relatively high currents flowing in the current carrying wire. As such, electric machine designs that use high frequency currents are typically small size electric machines, while relatively larger size electric machines are traditionally unable to take full advantage of the benefits of a high frequency supply source.

Previous efforts to improve the power density of electric machines were largely focused on solving this problem by increasing a "Slot-Fill-Factor," or more generally by increasing the amount of conductor material inside each slot of the core.

For example, U.S. Pat. No. 8,575,809 discloses a system that attempts to increase the power density by using trapezoidal slots. Trapezoidal slots can be formed as spaces between rectangular protrusions extending radially out of an outer circumference of the core, for example. Such trapezoidal slots generally have a smaller width near the bottom of the slot that increases gradually in the radial direction toward the opening at the top of the slot. This design typically attempts to improve efficiency/power density by changing the shape of each layer inside a slot so as to completely fill the slot. In other words, this type of optimization generally aims to increase the amount of conductor material inside each slot by changing the shape (e.g., width) of the layers, depending on the width of the trapezoidal slot at the radial position of the layer. Generally though, the actual cross-sectional areas of all layers in a slot are typically the same. For example, the thickness of a wider layer may be less than the thickness of a narrower layer below it so that both layers have a same cross-sectional area.

As another example, European Publication No. EP 2017854 discloses a design that uses concave shaped slots, which generally have a trapezoidal shape but where the maximum width of the slot is at the bottom of the slot and the minimum width is at the top (i.e., opening) of the slot. In this type of design, lower layers of the wire are wider (e.g., to fill the greater width of the slot near the bottom) but also less thick (in the radial direction), as compared to the narrower but thicker higher layers inside the slot.

While these designs (and other traditional designs) may provide some improvements in terms of maximum torque available or power density (e.g., by increasing the "Slot-Fill-Factor" or the amount of conductor material per slot), such designs are still generally not practical or efficient enough for large electrical machine applications, especially high frequency applications because they are still susceptible to high power losses associated with parasitic effects. Also, such designs (and other traditional designs) could be susceptible to additional power losses due to high temperatures associated with high rotation speeds used in some of the relatively larger electrical machine systems.

SUMMARY

The present disclosure presents new and innovative electric machines and related systems, devices, and methods, which provide and enable significant advantages over electric machines of the type described above.

In an example, a stator for an electric machine is provided. The stator comprises a stator core having an annular shape and having a plurality of slots in a circumferential arrangement. Each of the plurality of slots extends axially from a proximal end to a distal end of the stator core. The stator also comprises a first layer of conductors and a second layer of conductors. Each conductor of the first layer and the second layer has: (i) an active part disposed inside a respective slot of the stator core, (ii) a proximal frontal part extending outside the respective slot at the proximal end of the stator core, and (iii) a distal frontal part extending outside the respective slot at the distal end of the stator core. Proximal frontal parts of the first layer of conductors have a first shape. Proximal frontal parts of the second layer of conductors have a second shape different than the first shape.

In another example, an electric machine is provided comprising a shaft, an external rotor, and an internal rotor. The shaft extends axially through a center of the electric machine. The internal stator includes a stator core, a stator winding, and power electronics. The power electronics are integrated inside the internal stator and disposed between the stator core and the shaft. The power electronics are electrically coupled to the stator winding.

In another example, an electrical machine is provided. The electric machine comprises a rotor and a plurality of rotor bars disposed in a circular arrangement and extending axially through the rotor. The electric machine also includes a hollow shaft disposed at a center of the electric machine and extending axially from a proximal end to a distal end. The hollow shaft is in fluid communication with the plurality of rotor bars. The hollow shaft is configured to receive a coolant at the proximal end and to transport the coolant toward the distal end. The hollow shaft is configured to receive spent coolant, at the distal end, returning from the rotor and to transport the spent coolant toward the proximal end of the hollow shaft.

The features, examples, aspects, and advantages described above are not all-inclusive and, in particular, many additional features and advantages will become apparent to one of ordinary skill in the art in view of the figures and description. Moreover, it should be noted that the language used in the specification has been principally selected for readability and instructional purposes, and not to limit the scope of the disclosed subject matter.

DETAILED DESCRIPTION

Figure 1:
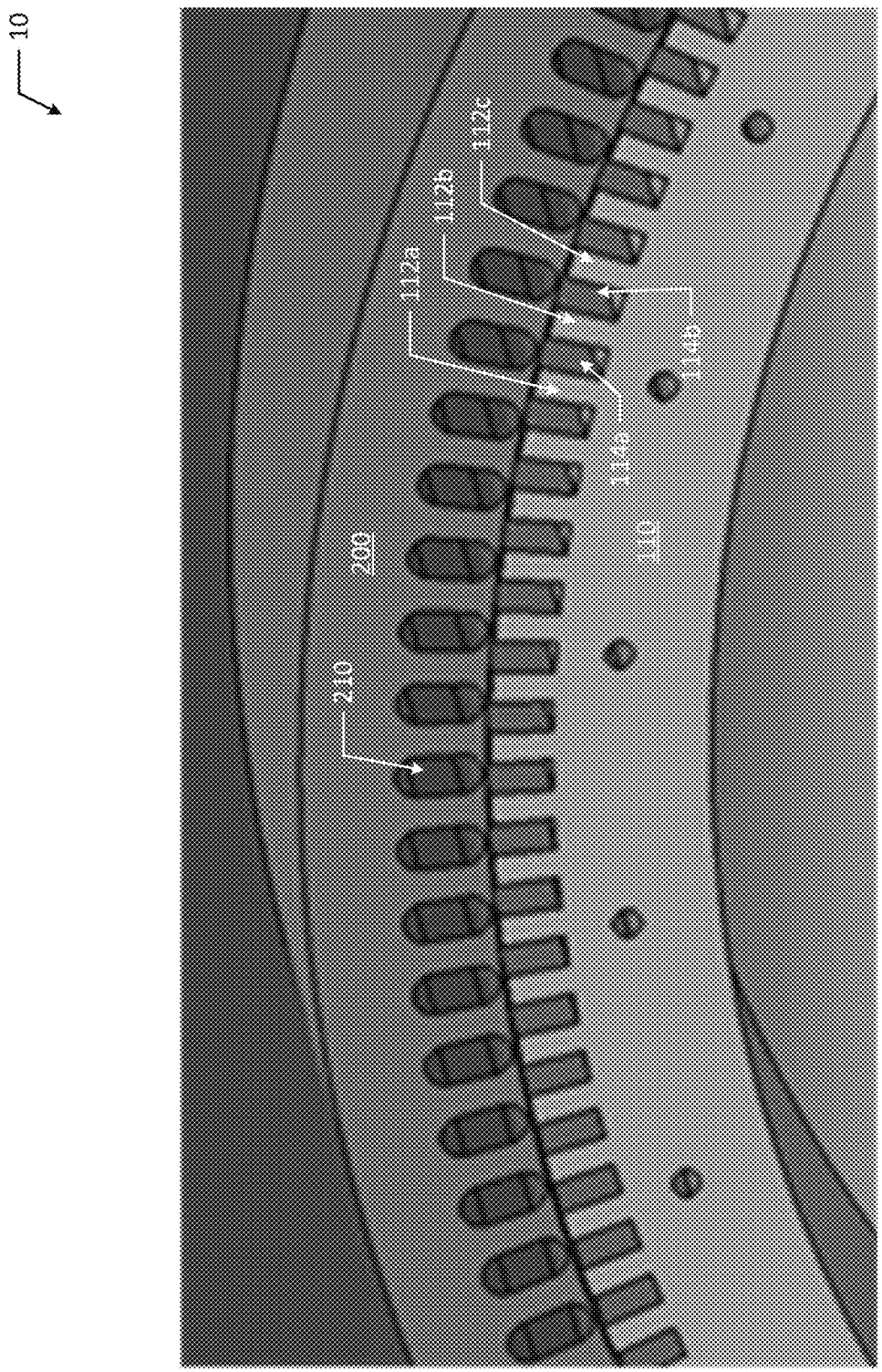
FIG. 1 is a partial view of an example magnetic circuit that includes an external rotor, according to an example embodiment.

The following detailed description of the invention is merely exemplary in nature and is not intended to limit the invention or the application and uses of the invention.

The present disclosure provides example electric machine configurations optimized to minimize power losses.

Example processes used to compute the optimum geometry of various components of a stator coil and stator core to minimize power losses ("Tuned Coil Theory") are described in U.S. patent application Ser. No. 16/654,829 filed on Oct. 16, 2019, the entirety of which is incorporated herein by reference.

An example process for designing an electrical machine (i.e., computing the optimum geometries) in accordance with the present disclosure is as follows. An AC resistance of conductors in the stator winding is computed using the Dowell approach based on both skin effect and proximity effect determinations. Generally, the Dowell approach is a technique/calculation for determining losses. In this example, the Dowell approach is used to reliably predict an increased resistance in the windings of a foil (e.g., the stator winding of an example electric machine herein) and/or round conductors applied to transformers. For example, a closed expression of the AC resistance calculation may indicate that particular dimensions of conductors placed in a slot in accordance with the present disclosure has a major influence on total losses in efficiency. One example expression of the AC resistance is non-linear. To that end, some examples herein involve using a Nonlinear Conjugate Gradient (NCG) computation or method to optimize the geometry of the conductors. The NCG method is a technique for numerical optimization of nonlinear problems and may have relatively low memory requirements. One example method herein involves finding the minimum of a nonlinear function using its gradient (e.g., based on the NCG method). The example method also involves applying a sequence of conjugate directions to determine an optical location via successive approximations according to the equation below:

$$u_{i+1} = u_i + a_i d_1$$

The example method involves, based on the equation above, refining the step length (a) at each iteration (i) based on an exact line search technique. In the equation above, (d) is in the direction of the gradient. Using this example method, optimum layer thicknesses can be computed to minimize power losses based on the material of the conductor in each layer (e.g., which decides the material resistivity at a certain temperature), the number of layers, and the layer positions in a slot.

Some examples herein also address uneven distribution of losses among turns of a coil. For example, a layer thickness of a conductor in a first layer are selected to be higher than a layer thickness of a conductor in a second layer above the first in the same slot. Basically, the first layer may be exposed to losses associated with its own field (versus the second layer which is exposed to the total field). As such, some examples herein involve configuring the first layer or first turn to be taller (or thicker) than a last layer or turn in the same slot. In this way, for instance, joule losses can be decreased.

In one specific example, a stator is provided that includes a first layer of conductors and a second layer of conductors. In this example, a geometry of the first layer and second layer of conductors (i.e., radial positions, thicknesses, etc.) is optimized based on a given power supply frequency (e.g., 500 Hz, 750 Hz, etc.) to minimize an alternating current (AC) resistance of the conductors, in accordance with the discussion above. The AC resistance may be calculated using the Dowell approach, for instance, and the geometry can be selected using a nonlinear conjugate gradient (NGC) computation, in line with the discussion above.

In one aspect of the present disclosure, the geometry of conductors inside each slot of a stator core is optimized based on material type (e.g., Aluminum, Copper, etc.), power supply frequency, and conductor position in the slot (e.g., layer thickness and cross-sectional area regressively decreases depending on position of the layer in the slot). For example, the thickness of the current carrier in the slot varies based on a turn number or order of a turn in the slot. The highest turn may have the lowest thickness, for example. With this arrangement, parasitic effects can be reduced at the higher turns, which are more susceptible to eddy currents for example due to the magnetic fields of the other turns below them in the slot.

In another aspect, the geometry of conductors outside the slots is also optimized to minimize power losses such as power losses due to interactions with leakage flux (e.g., outer conductors are thinner and taller than in-slot conductors). In general, the geometry of the tuned coils or windings is selected specifically to reduce parasitic effects and to optimize performance of electric machines when using high frequency currents, including MegaWatt class electric machines. As a specific example, for aluminum conductors operating at 750 Hz supply frequency, the geometric thickness for the current carrying conductors outside the slots (e.g., frontal parts) is selected between 1.5 millimeters and 1.8 millimeters (e.g., 1.6 millimeters or 1/16th of an inch), which was calculated as an optimal thickness for minimizing power losses at that frequency. Thus, more generally, the geometry of various parts of the stator winding can be optimized to different values depending on the operating frequency and the conductor material. The frontal parts (outside the stator core) may be sized as tall as practical (depending on space limitations inside the stator, etc.). Generally, a taller conductor will have smaller losses due to its increased useful cross section, however a taller conductor may also increase the equivalent length per turn of the stator winding (which may result in no gain in terms of loss reduction). In some examples, the frontal parts are oriented substantially parallel to leakage flux. With this arrangement, power losses can potentially be reduced by an order of magnitude compared to a configuration where the frontal parts have a perpendicular orientation to the leakage flux.

In another aspect, the slots are optimized to minimize power losses associated with secondary flux near a top (i.e., opening) of a slot. For example, slots may be configured to have an elongated shape such that an elongate gap is left unfilled between the opening (top) of a slot and a top-most conductor layer inside the slot. Power losses may be concentrated in layers near the top of the slot (i.e., closer to the rotor due to secondary magnetic flux (exiting the sides of the teeth defining the slots) and extending toward the rotor. This secondary flux can be calculated using Carter's formula and effectively results in a smaller magnetic airgap than the geometric airgap of the rotor. However, in some configurations, the secondary flux may induce eddy currents/loop currents in the body of the conductors inside the slot (especially conductors near the top of the slot). As such, some examples herein avoid or reduce the intersection between the secondary flux and the conductors inside the slot by keeping an unfilled elongation gap between the uppermost conductor and the opening of the slot.

In another aspect, power electronics connected to the stator winding are integrated inside the stator (e.g., disposed between the stator core and a center of the stator) to further minimize power losses associated with more distant relative arrangement between the power electronics and the stator winding, as well as to enable efficiently cooling the various components of the electric machine (including the power electronics).

In another aspect, conductor layers inside each slot are separated by a separation gap (e.g., 1 millimeter to 2 millimeters), and a coolant is directed into the separation gap to flow between adjacent layers inside the slot. In this way, the present disclosure enables an improved mechanism for cooling the stator winding.

More generally, maintaining various parts of an electrical machine at relatively lower temperatures can result in lower power losses.

To that end, in another aspect, example cooling systems are also provided herein for cooling various parts of an electric machine efficiently. An example cooling system transports a coolant through rotor bars of the rotor, through slots of the stator (including between conductor layers inside each slot), and/or through other sections of the electric machine (e.g., adjacent to power electronics) efficiently. Further, an example cooling system includes a multi-layer coolant sealing mechanism to reduce the likelihood of coolant dissipation. For example, a fuel (e.g., liquefied natural gas (LNG), etc.) can be used as a coolant. In this example, the example multi-layered sealing mechanism reduces the likelihood of dissipation of the fuel during operation of the electric machine.

FIG. 1 illustrates a partial view of an example magnetic circuit 10 that includes an external rotor 200 and a stator core 110, according to an example embodiment. For example, the rotor 200 may be configured to rotate around the stator core 110.

As shown, the stator core 110 has a plurality of teeth (e.g., teeth 112a, 112b, 112c, etc.), which may be collectively referred to herein as teeth 112. The teeth 112 extend radially outwards toward the rotor 200 to define a plurality of slots (e.g., 114a, 114b, etc.), which may be collectively referred to herein as slots 114. The slots 114 are circumferentially arranged at an outer side of the stator core 110 facing the rotor 200. For example, slot 114a is defined as the slot between adjacent teeth 112a and 112b, slot 114b is defined as the slot between adjacent teeth 112b and 112c, and so on. In some examples, the slots 114 may be equally spaced along the periphery or outer side of the stator core 110. In some examples, the slots 114 may be square slots, rectangular slots, or other types of slots. In the illustrated example, the slots 114 are fully open rectangular slots. In alternate examples, the slots 114 can have a different shape or spacing configuration. The slots 114 may extend axially (e.g., through the page) from a proximal end of the stator core 110 (e.g., the end shown in FIG. 1) to a distal end of the stator core 110 opposite the proximal end.

In the illustrated example, the rotor 200 includes a plurality of rotor bars (e.g., rotor bar 210) disposed in a circumferential arrangement (and extending axially through the rotor 200 into the page). As shown, for example, the rotor bars 210, etc., may be arranged along an inner periphery of the rotor 200 opposite the slots (e.g., 114a, 114b, etc.) of the stator core 110. The rotor bars 210 can be implemented as fully closed oval bars, open oval bars, or any other type of rotor bars. Example possible shapes for the rotor bars 210, etc., include round, rectangular, square, among other possible shapes. In one specific example, an air-gap diameter of the rotor 200 is 520 millimeters. In this example, the rotor 200 can have a tangential speed of about 5000 rpm that corresponds to about 140 meters/second. In this example, centrifugal loads associated with such geometry can be mitigated by using specially developed magnetic steels, such as any magnetic steel material that can sustain mechanical stresses that are 2.5 to 3 times higher than some other types of steel (e.g., silicon steel, etc.) for example. It should be appreciated that these parameters are only provided for the sake of example and are not meant to be limiting. For example, other diameters, materials, mechanical stresses, and/or rotational speeds are possible.

Figure 2:
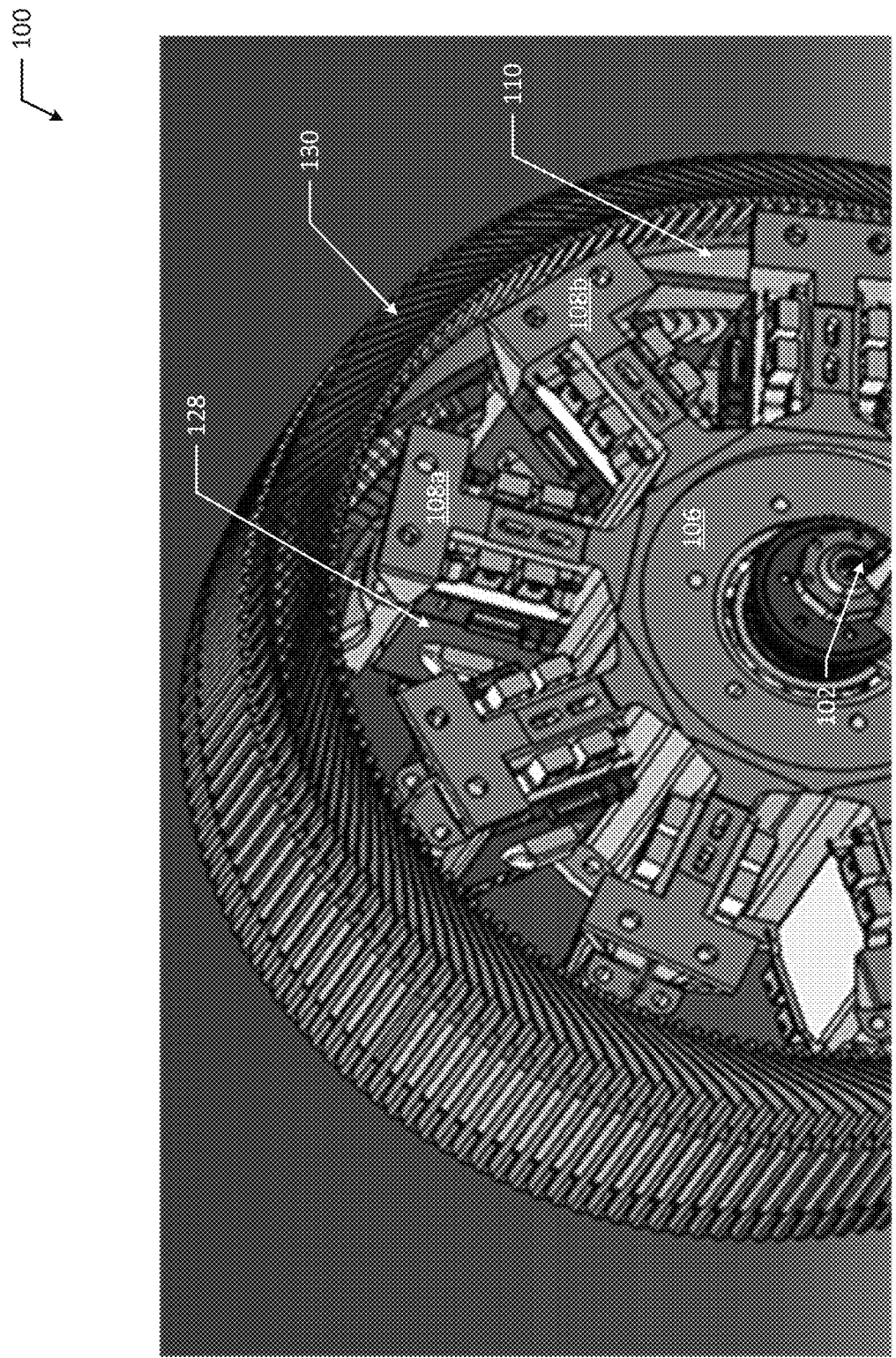
FIG. 2 is a partial perspective view of an example stator including power electronics integrated inside the stator, according to an example embodiment.

FIG. 2 illustrates a partial view of an example stator 100, according to an example embodiment. The stator 100, for example, can be employed as an internal stator of an electrical machine that includes an external rotor (e.g., rotor 200 of FIG. 1, etc.) configured to rotate around the stator 100. It is noted that some of the components of the stator 100 are removed from the illustration of FIG. 2 for convenience in description. As shown, the stator 100 includes a shaft 102 extending axially (e.g., through the page) at a center of the stator 100. As shown, the stator 100 also includes a stator winding 130 extending around the stator core 110.

In the illustrated example, the stator 100 also includes a support structure 106 extending around the shaft 102 and disposed between the stator core 110 and the shaft 102. For example, the support structure 106 may include an aluminum wheel or may be formed as any other solid structure configured to support the stator core 110 and/or other components of the stator 100.

In the illustrated example, the stator 100 also includes a plurality of spokes 108*a*, 108*b*, etc., collectively referred to herein as spokes 108. The spokes 108 are disposed inside the stator and extend radially from the support structure 106 to the stator core 110. In some examples, each spoke 108 may be associated with a phase of the stator 100. For example, in a nine-phase electrical machine, the stator 100 may include nine spokes. In some examples, each spoke 108 is configured as a heat sink for various power electronics (e.g., transistors, capacitors, inverters, etc.) mounted to and/or otherwise coupled to the spokes 108 (and/or the support structure 106).

Further, as shown, stator 100 includes power electronics integrated inside the stator 100, such as a pair of transistors (e.g., transistor 128) mounted at opposite sides of each spoke 108. With this arrangement, for example, two given side-mounted transistors 128 mounted to a given spoke 108 can be cooled by transporting a coolant fluid (not shown) inside the given spoke 108. A non-exhaustive list of example possible type of transistors 128 includes insulated gate power bipolar transistors (IGBT), SiC transistors, GaN transistors, MOSFETs, among other possible types of transistors.

Figure 3:
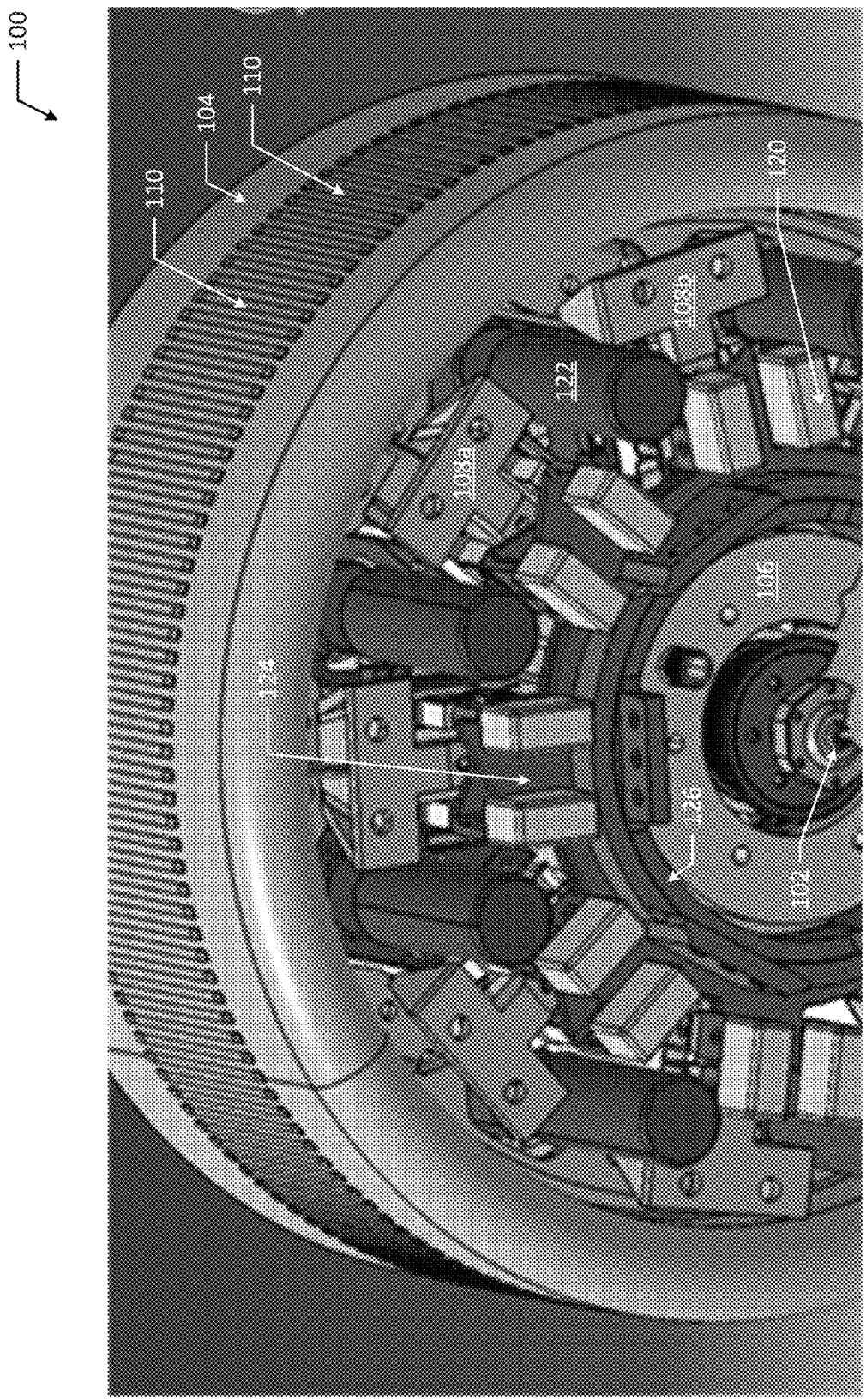
FIG. 3 is another partial perspective view of the example stator of FIG. 2, according to an example embodiment.

FIG. 3 illustrates another partial perspective view of the example stator 100, according to an example embodiment. As shown, the stator 100 also includes a housing 104, which may be formed from a non-magnetic material suitable for protecting components of the stator disposed therein, such as stator core 110, stator coils 130, etc. For example, the stator core 110 (portions of which are exposed through the housing in the illustration of FIG. 1) is disposed inside the housing 104.

It is noted that various types of power electronics components and/or arrangements are possible without departing from the scope of the present disclosure. For the sake of example, FIG. 3 shows example power electronics such as stepper capacitors (e.g., capacitor 120), filter capacitors (e.g., capacitor 122), DC bus parts 124, 126, etc. In some examples, the DC bus parts 124, 126 are machined from aluminum. However, other materials and/or power electronics structures are possible.

In one specific example, the stator 100 includes 9 phases (e.g., at 20 degree separation angles from one another) and an inverter topology that includes 18 half bridges with two bridges in parallel per phase (e.g., 3 "Y" output circuits with insulated neutrals, etc.). However, it is noted that a variety of other configurations are possible such as fewer or more phases, different types of power electronics (e.g., SiC transistors, GaN transistors, Mosfets, etc.). However, for the sake of example, this implementation may have the following motor parameters: minimum electric input of 1000 V, a Vmax (or Vces) of 1700 V, a maximum current of 2000 A, a phase voltage of 400 V (rms), a phase current of 600 A (rms), a nominal current of 1200 A, Icrm of 3600 A, apparent power of 2160 kVA, and an active power of 1700 kW. However, as noted above, these parameters are only exemplary and are not meant to be limiting.

For the sake of example, the table below lists electrical parts for one specific example motor configuration that includes the stator 100, together with a calculation of a resulting power density. However, it is noted that the values and components listed in the table below are merely for the sake of example and are not meant to be limiting.

Example components and estimated power density calculation for one possible example motor configuration that includes stator 100

Figure 4A:
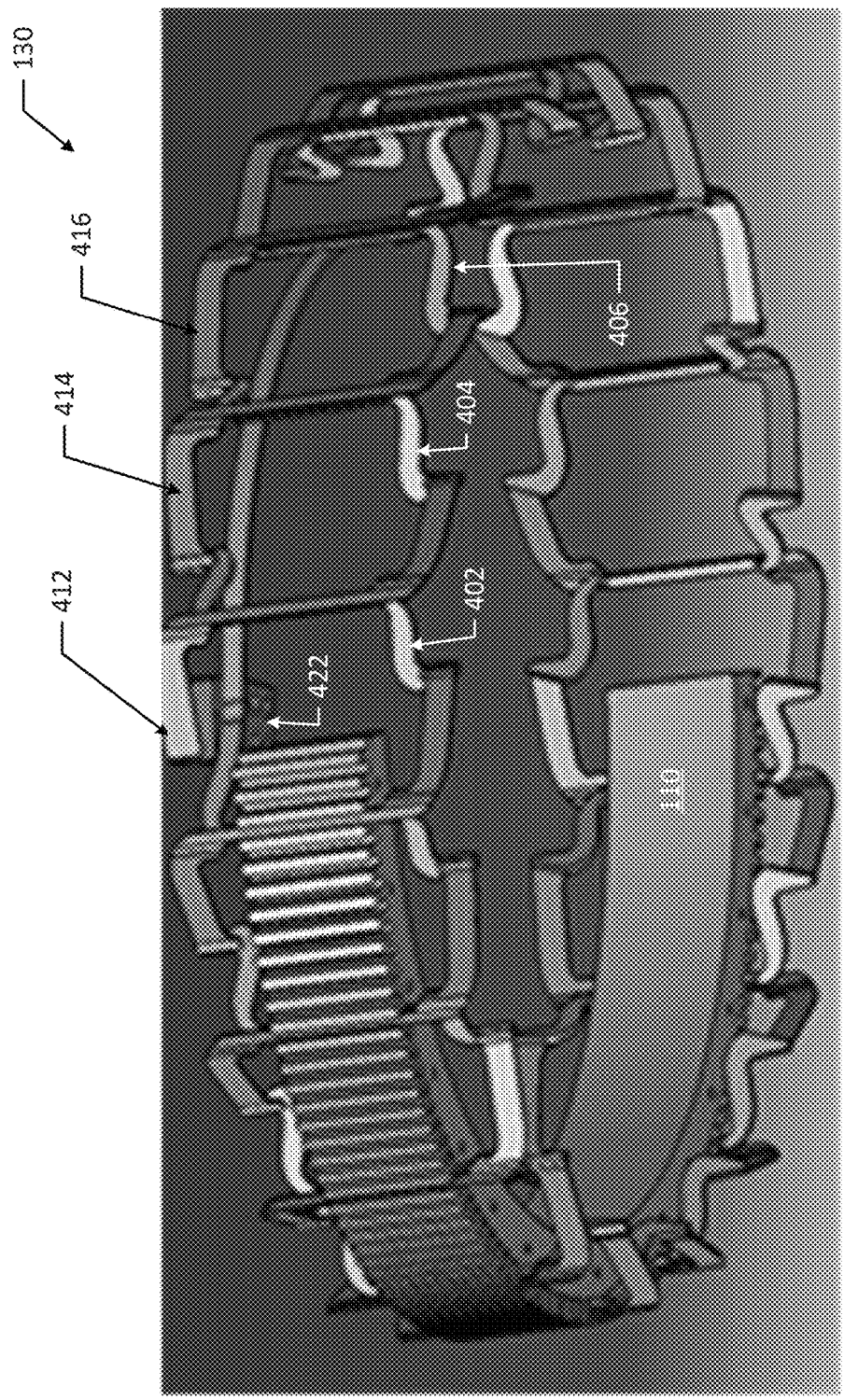
FIGS. 4A, 4B, and 4C are partial views of an example two-layer single-phase stator winding configuration, according to an example embodiment.

IGBT unit: 411 gr × 18 = 7.4 kg
Driver unit: (28 gr + 8 gr) × 18 = 0.65 kg
Capacitor ALF20: 131 gr × 18 = 2.36 kg
Snubber MMKP: 85 gr × 18 = 1.53 kg
DC buss components = 1.4 kg
Fasteners and elastic connections (aprox):
2 kg +/− 15 V DC power supply: 275 gr
Speed sensor: 130 gr (including teeth wheel)
Current sensors: not needed
Coolant pump: not needed or included in the sealing unit
Control board: estimated under 250 g
Total: 16 kg
Other mounting minor hardware: 1 kg
Grand TOTAL = 17 kg
for 1.7 MW
Power density at room temperature and cosfi 0.8 = 100 kW/kg (or greater with advanced components FIG. 4A illustrates an example single-phase two-layer configuration of stator winding 130, according to an example embodiment. For convenience in description, a portion of the stator core 110 is also shown in FIG. 4A. As shown in FIG. 4A, the stator winding 130 includes a first layer of conductors 402, 404, 406, etc., and a second layer of conductors 412, 414, 416, etc. In some examples, the first layer of conductors 402, 404, 406, etc., and the second layer of conductors 412, 414, 416, etc., are connected sequentially (e.g., in series) to form a continuous electrical circuit between two end connectors (e.g., end connector 422).

In some examples, each of the first layer conductors 402, 404, 406, etc., is partially disposed inside a respective slot of the stator core 110 below one of the second layer conductors 412, 414, 416, etc. For example, an active part of first layer conductor 402 can be inserted into a same slot (not shown) below an active part of the second layer conductor 412, and so on. In general, an "active part" is a central portion of the conductor that is disposed inside a slot. In some examples, each conductor of the first layer of stator winding 130 has a first particular shape and each conductor of the second layer of stator winding 130 has a second different shape. For example, the first layer of stator coil 130 can be formed as a first array of conductive structures (e.g., semi-bobbins) that have a first shape and the second layer of stator coil 13 can be formed as a second array of conductive structures (semi-bobbins) that have a second different shape. In this example, the first array and the second array of conductors can be evenly arranged and interconnected to form the stator coil 130.

Each conductor (or semi-bobbin structure) in the first layer and the second layer includes a central portion disposed inside a slot (referred to herein as an active part) and two frontal parts extending out of the slot (e.g., one frontal part extending out of a first end of the slot and another frontal part extending out of a second opposite end of the slot).

Figure 4B:
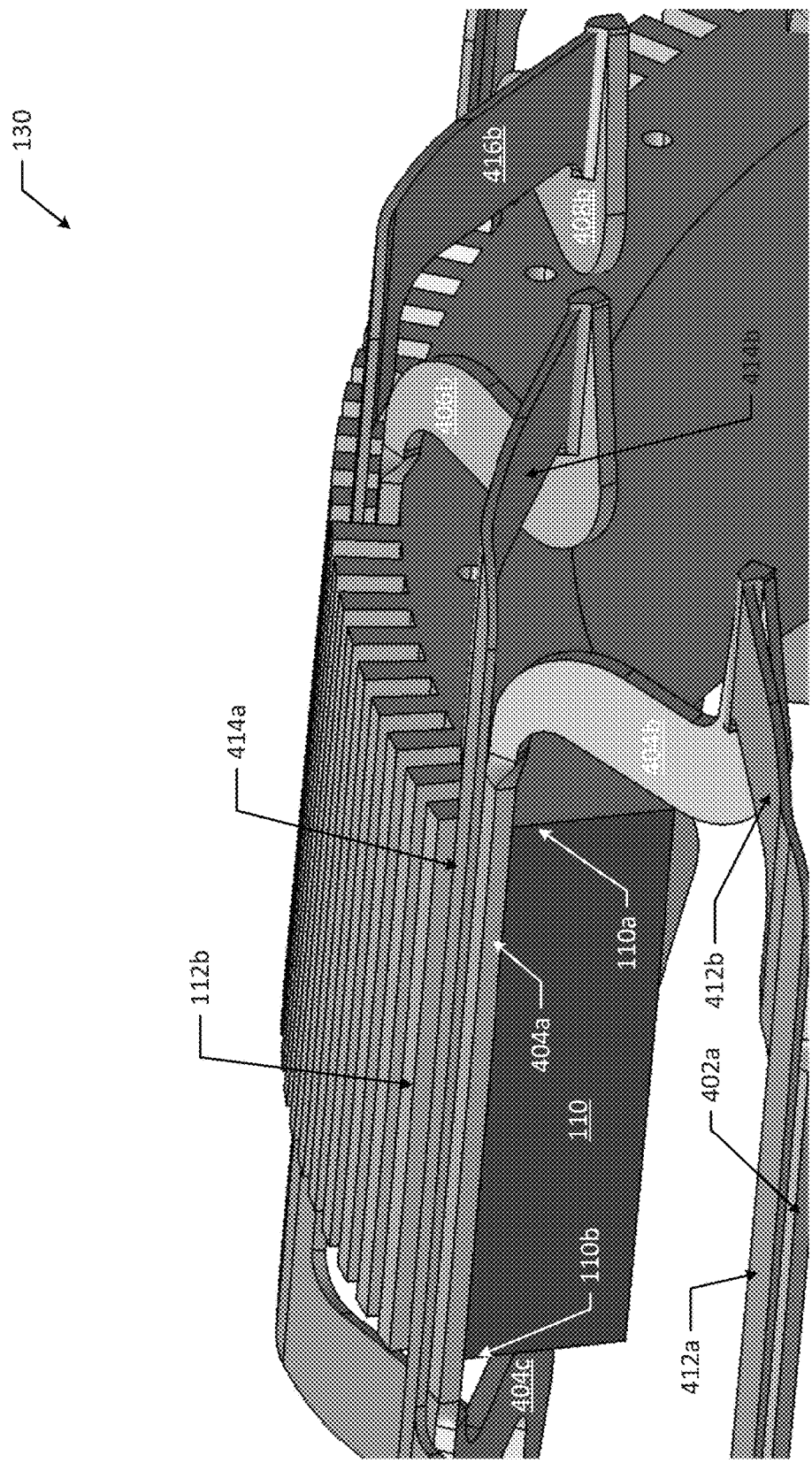

FIG. 4B illustrates an expanded view of a portion of the stator winding 130 of FIG. 4A. For convenience in description, a different portion of the stator core 110 is shown in FIG. 4B. As shown in FIGS. 4A and 4B, each conductor (e.g., semi-bobbin) of the first layer and the second layer has: (i) an active part disposed inside a respective slot of the stator core 110, (ii) a proximal frontal part extending out of and away from the respective slot at proximal end 110*a* of the stator core 110, and (iii) a distal frontal part extending out of and away from the respective slot at a distal end 110b of the stator core 110.

For example, as best shown in FIG. 4B, the first layer conductor 404 has an active part 404a disposed inside a first slot (e.g., the slot adjacent to tooth 112b) and extends axially from the proximal end 110a of the first slot to the distal end 110b of the first slot. An active part 414a of the second layer conductor 414 is also disposed inside the first slot (at a second radial position above a first radial positon of the active part 404a) and extends axially from the proximal end 110a to the distal end 110b. The active part 402a of the first layer conductor 402 and the active part 412a of the second layer conductor 402 can be similarly disposed inside a second different slot (not shown), and so on.

Continuing with this example, as best shown in FIG. 4B, the first layer conductor 404 also includes a proximal frontal part 404b extending out of and away from the first slot (in which the active part 404a is disposed), at the proximal end 110a, in a first direction toward frontal part 412b of the second layer conductor 412. The first layer conductor 404 also includes a distal frontal part 404c extending out of and away from the first slot, at the distal end 110b of the stator core 110, in a second direction toward a different frontal part (not shown) of a different second layer conductor. Proximal frontal part 414b of the second layer conductor 414 extends away from the slot (at the proximal end 110a of the stator core 110) toward proximal frontal part 406b of first layer conductor 406, which has an active part disposed inside a third (different) slot. A proximal frontal part 416b of second layer conductor 416 extends away from the third slot to a proximal frontal part 408b of another first layer conductor at a fourth slot, and so on.

Thus, in some examples, each conductor of the first layer is connected in series with one or two other conductors of the second layer to form a chain of conductors in an alternating order of conductors from the first layer and conductors from the second layer.

Further, as shown, each conductor of the first layer (e.g., conductors 402, 404, 406, 408, etc.) has a first shape different than a second shape of each conductor of the second layer (e.g., 412, 414, 416, etc.). Moreover, frontal parts of the first layer have a same first shape different than frontal parts of the second layer. With this arrangement, for example, frontal parts of the second layer can extend over frontal parts of the first layer without contacting their overlapping portions except at locations where two particular frontal parts are connected to one another (e.g., where frontal part 404b of the first layer is connected to frontal part 412b of the second layer, etc.). In some examples, the connection between two particular frontal parts (e.g., frontal part 404b and frontal part 412b) can implemented using laser deposition, welding, brazing, soldering, riveting, implosion, diffusion, or any other suitable machining process depending on the shape, material, thickness, etc., of the respective frontal parts.

In some examples, one or more of the first layer conductors (e.g., 402, 404, 406, etc.) is formed from a single sheet of metal (e.g., Aluminium) having a first sheet thickness. For example, a portion of the first single sheet of metal can be machined (e.g., cut, twisted, deformed, etc.) to form the active part 404a, the proximal frontal part 404b, and the distal frontal part 404c. The same first single sheet (or a different sheet having the same first sheet thickness) can be used to similarly form each of the other first layer conductors 402, 406, 408, etc.

Additionally, in some examples, one or more of the second layer conductors 412, 404, 416, etc. can be formed from a second single sheet of metal having a second sheet thickness that is less than the first sheet thickness. For example, a portion of the second single sheet can be cut, twisted, deformed, etc., to form the second layer conductor 414, including its active part 414a and its frontal parts 414b, etc.

Figure 4C:
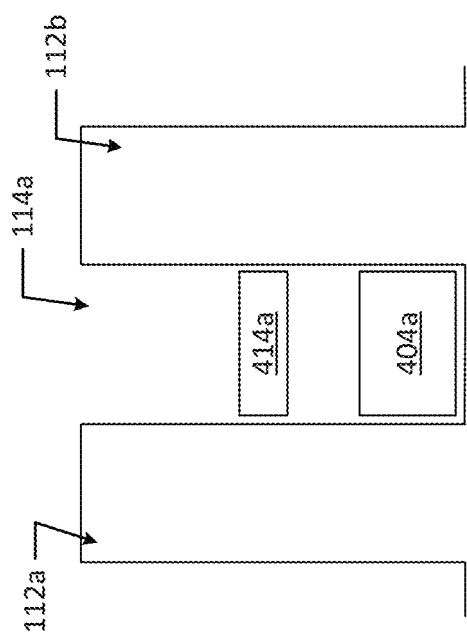

FIG. 4C illustrates a transverse cross-section view of a portion of the stator winding 130 of FIGS. 4A and 4B. As shown in FIG. 4C, the active part 404a of the first layer conductor 404 is disposed inside the slot 114a at a first radial position (e.g., as a first layer inside the slot 114a), and the active part 414a of the second layer conductor 414 is disposed inside the same slot 114b but at a second radial position. In some examples, as shown, cross-sections of the active parts 404a and 414a inside the slot 114a have rectangular shapes with same widths but different heights. As noted above, the sizes (e.g., heights and widths) of the conductors 404 and 414 inside the slot 114a are selected based on an expected supply frequency of the stator winding 130, a conductor material of the conductors 404, 414, and so on, to minimize power losses.

Further, as shown, the active parts 404a (of the first layer) and 414a (of the second layer) are separated by a separation gap (in the radial direction) inside the slot 114a. This separation gap can be used as a channel for coolant to cool the active parts 404a and 414a during operation of the stator 100, for example. Further, as shown, the slot 114a has an elongate shape such that the upper most conductor (i.e., the active part 414a of the second layer) inside the slot 114a is separated from an opening of the slot 114a by an elongation gap. As noted above, this elongation gap avoids positioning a conductor in a region of the slot 114a that may be susceptible to power losses associated with secondary flux inside the slot 114a.

Figure 5:
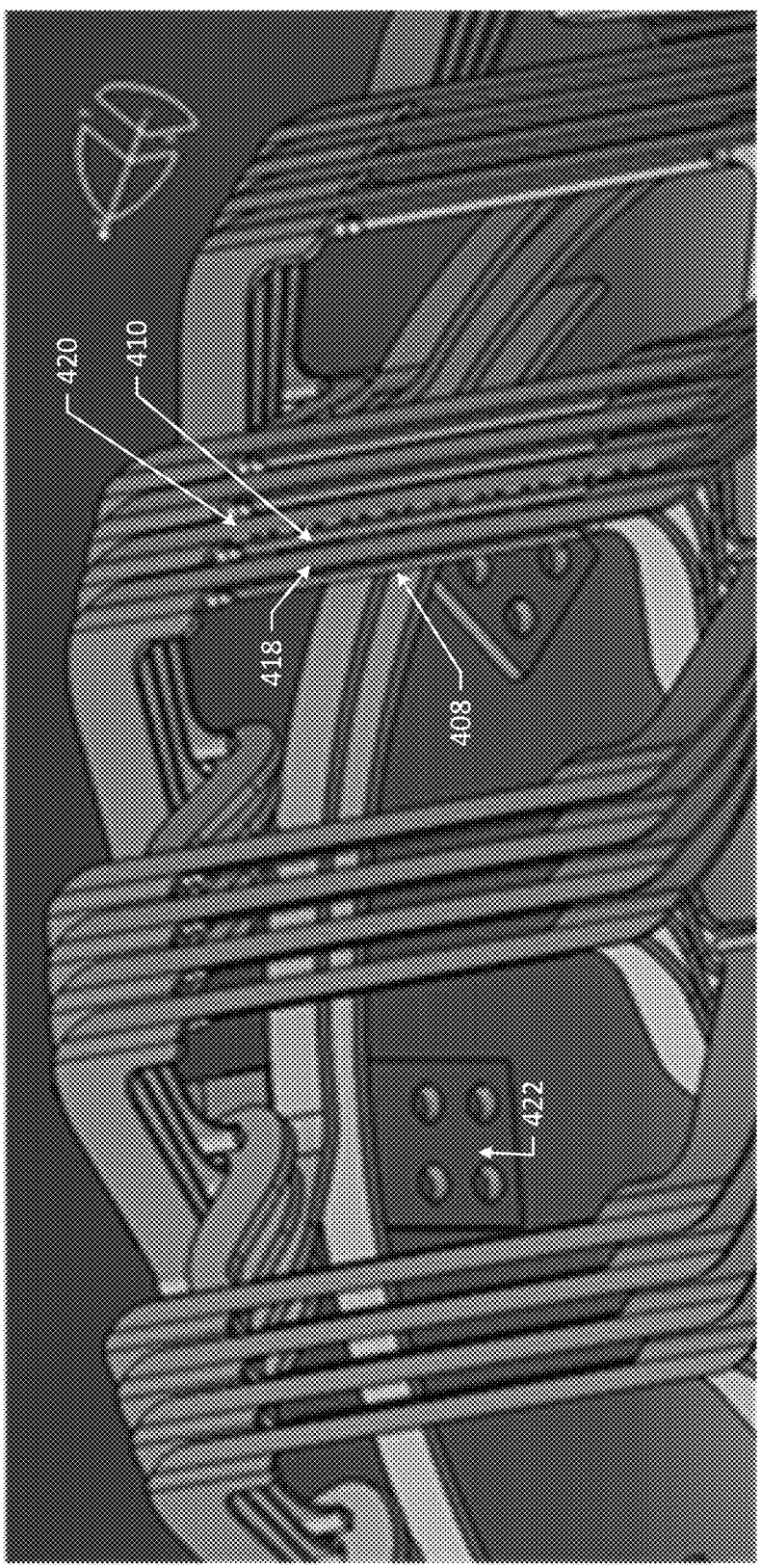
FIG. 5 is a partial view of an example four-phase two-layer stator winding configuration, according to an example embodiment.

FIG. 5 illustrates a partial view of an example four-phase two-layer configuration of the stator coil 130, according to an example embodiment. For example, active parts of first layer conductor 408 and second layer conductor 418 can be inserted in a first slot (not shown), active parts of first layer conductor 410 and second layer conductor 420 can inserted in a second adjacent slot, and so on. In this way, the stator coil 130 can include multiple sets of interconnected first layer and second layer conductors that form separate electrical circuits (i.e., separate phase windings) between respective end connectors.

Figure 6:
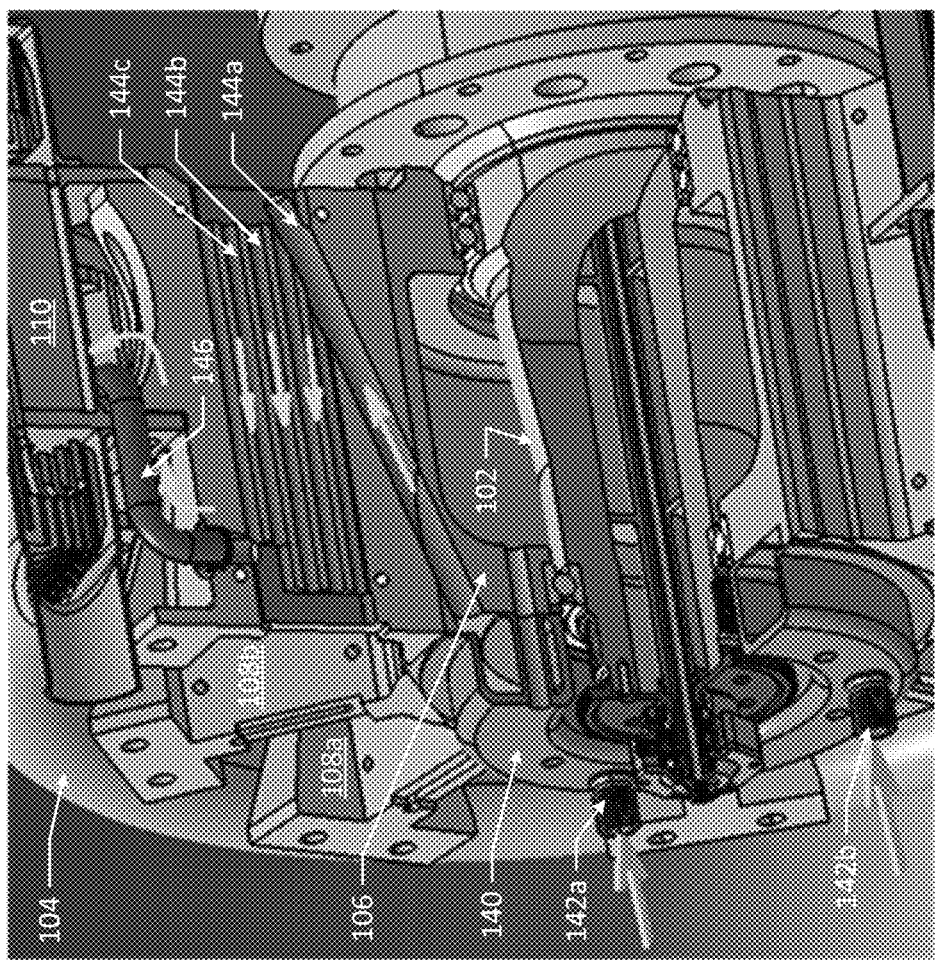
FIG. 6 illustrates a partial cross section view of an example electric machine that includes a stator cooling system, according to an example embodiment.

FIG. 6 illustrates a partial cross section view of an example electric machine 600 that includes a stator cooling system, according to an example embodiment. As noted above, the spokes 108 can be synergistically employed as a cooling mechanism for cooling the power electronics integrated inside the stator 100. As shown, the electric machine 600 includes an inlet manifold 140. The inlet manifold 140 includes one or more inlets 142a, 142b, etc., collectively referred to as inlets 142. In one specific example, the inlet manifold 140 includes three inlets 142. In alternate examples, the inlet manifold 140 may include fewer or more inlets. The inlets 142 are arranged to receive a coolant into the inlet manifold 140. The coolant, for example, may be a gas coolant or a liquid coolant. In one specific example, the coolant includes a combustible fuel For example, the coolant may include liquefied natural gas (LNG) fuel that is received at the inlets 142 in a liquid state.

The inlet manifold 140 is in fluid communication with one or more fluid channels 144a, 144b, 144c, etc., collectively referred to as fluid channels 144. For example, the spoke 108b may be machined with one or more of internal channels 144 to form a cooling labyrinth inside the spoke 108b. Each spoke 108 may have an oblique passage to the inlet manifold and may include parallel cooling circuits similarly to the cooling circuit shown inside the spoke 108b. Coolant exiting from the spoke 108 is delivered via a pipe 146 into a first cooling chamber under a back iron of the stator core 110 (e.g., between the housing 104 and an inner side of the stator core 110). For example, the housing 104 can be shaped to form the first cooling chamber by enclosing a space between the stator core 110 (e.g., back iron or back side of the stator core 110) and the housing 104.

Figure 7:
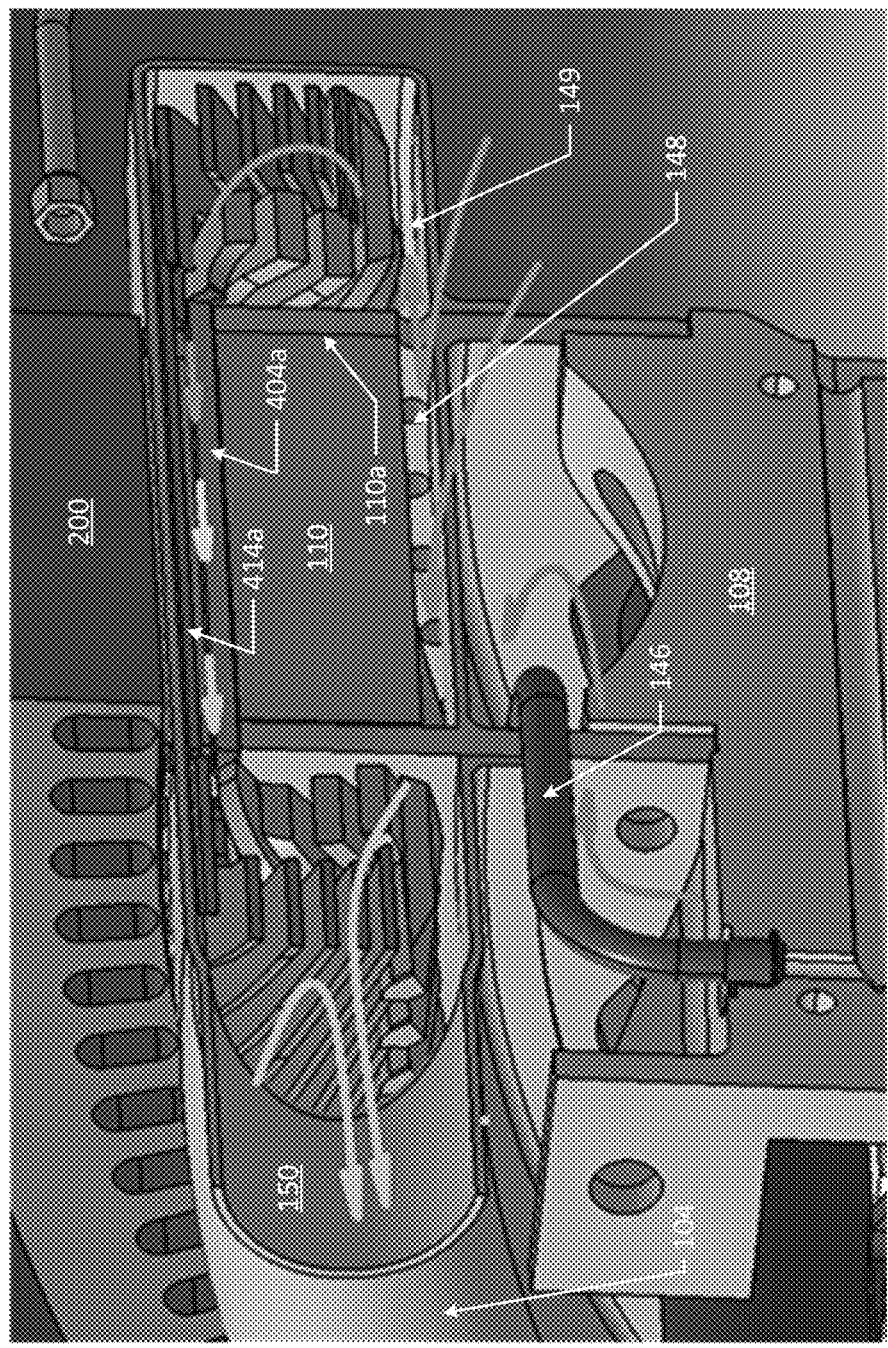
FIG. 7 illustrates another partial cross section view of the example electric machine of FIG. 6, according to an example embodiment.

FIG. 7 illustrates another partial cross-section view of the electric machine 600, according to an example embodiment. In some examples, the pipe 146 can be shaped to deliver the coolant at an approximately tangential pitch angle to the back iron/inner side of the stator core 110. With this arrangement, the coolant may flow as a helix flow inside the first cooling chamber (behind the back iron) with a pitch towards halls (exemplified by hall 148). The halls 148 are machined in a wall of the housing 104 and shaped to direct the coolant from the first cooling chamber into a second cooling chamber 149. The second cooling chamber may be shaped as a manifold that surrounds the proximal frontal parts of the stator coil 130 (i.e., the frontal parts of the first layer and the second layer that are extending out of the proximal end 110a)

As shown, active part 404a of the first layer conductor 404 of the stator winding 130 and active part 414a of the second layer conductor 414 are disposed inside a same slot (e.g., slot 114a) of the stator core 110, and are spaced apart (e.g., 1-2 mm apart, etc.) by a separation gap that inside the slot between the two layers 404a, 414a. As shown, the second cooling chamber/manifold 149 covers the encompasses the proximal frontal parts of the stator coil 130 at the proximal end of the stator core 110a. The cooling chamber/manifold 149 thus directs the coolant (received from the halls 148) into the separation gap between the two layers 404a and 414a. Similarly, the cooling chamber or manifold 149 directs the coolant into other separation gaps between the two layers at each of the slots (not shown) of the stator core 110.

As shown in FIG. 7, there are two layers 404a and 414a are disposed inside the same slot. As shown, the bottom layer/solid conductor 404a is thicker than the top layer/conductor 414b. Further, as noted earlier, the cross sections of the layers 404a, 414a are generally smaller than the cross sections of the frontal proximal parts of the stator coil 130. As a result, most of the power losses occur in the active parts inside the slots. To that end, some examples herein involve considering whether evaporative or semi-evaporative cooling is suitable and whether a particular amount of the coolant may boil mostly toward the end of the slot. For example, some examples include selecting and/or controlling a mix of liquid and gaseous coolants flowing through the fluid channel that may increase the speed of the combined coolants inside the slot so that the coolant flows out of the separation gap and into a third cooling chamber (e.g., manifold) that encompasses the distal frontal parts. The coolant then flows through the third cooling chamber to absorb heat from the distal frontal parts of the first layer and the second layer of the stator core 130, and then exits through an exit tube 150 and out of the housing 104. In a specific example, the exit tube 150 has a 1.5 inch diameter. In alternate examples, the exit tube 150 has a different size.

Figure 8:
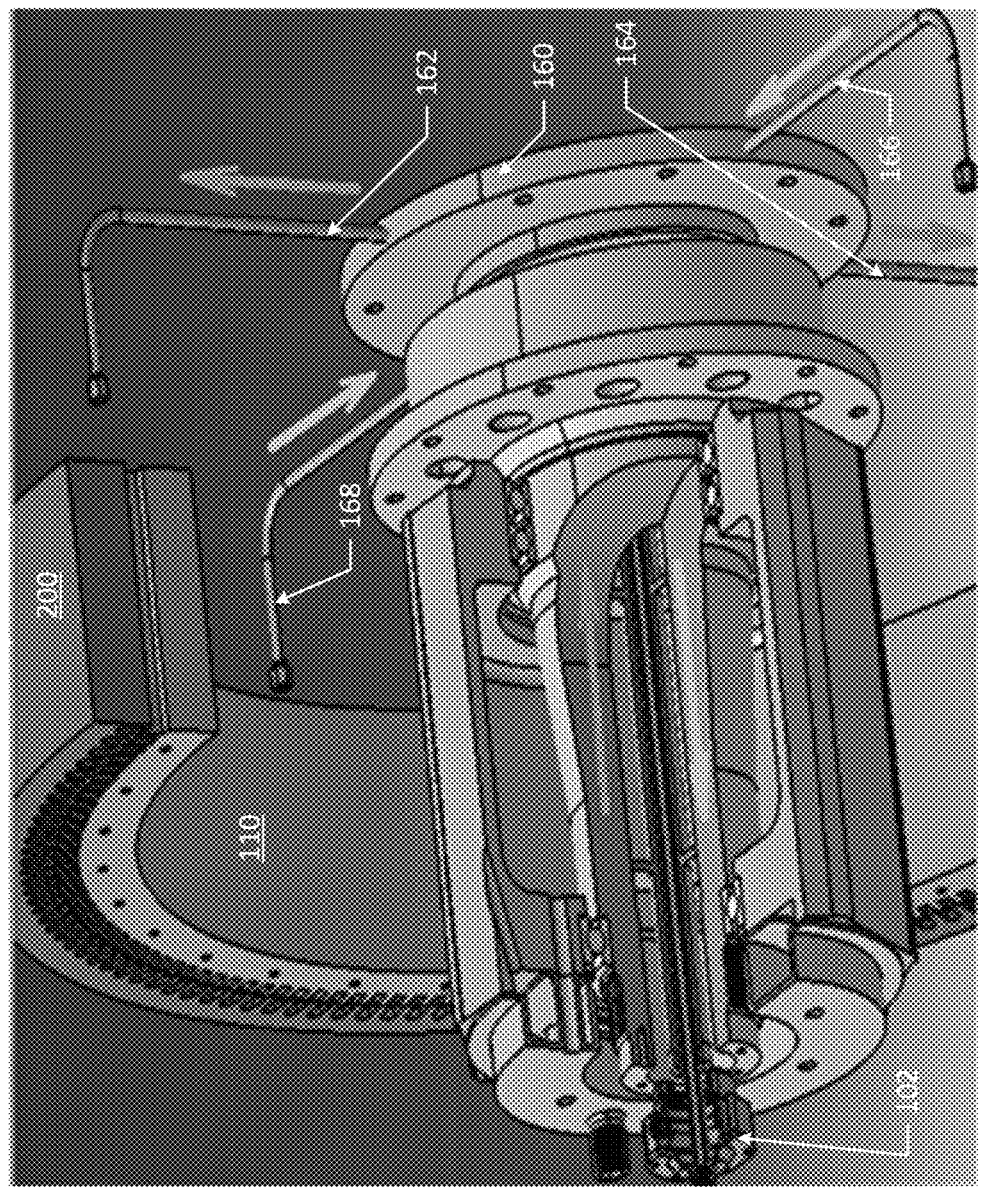
FIG. 8 illustrates a partial view of an example electric machine that includes a rotor cooling system, according to an example embodiment

FIG. 8 illustrates a partial cross section view of an example electric machine 800 that includes a rotor cooling system, according to an example embodiment. In general, rotor thermal load is relatively less than the stator thermal load. For example, the rotor 200 may have a thermal load between 4-8 kW. Therefore, a relatively small amount of coolant may be sufficient to maintain a cold temperature in the rotor while also improving the overall efficiency of the electric machine 800. In the illustrated example, the shaft 102 is a hollow shaft that includes an adaptive flange 160 to adaptively output (from a distal end of the hollow shaft 102) a flow of coolant through output tubes 162, 164, or to adaptively receive a returning flow of the coolant (back into the distal end of hollow shaft 102) from the input tubes 166, 168. In an example, a relatively small amount of coolant is transmitted into each oval rotor bar 210.

Figure 9:
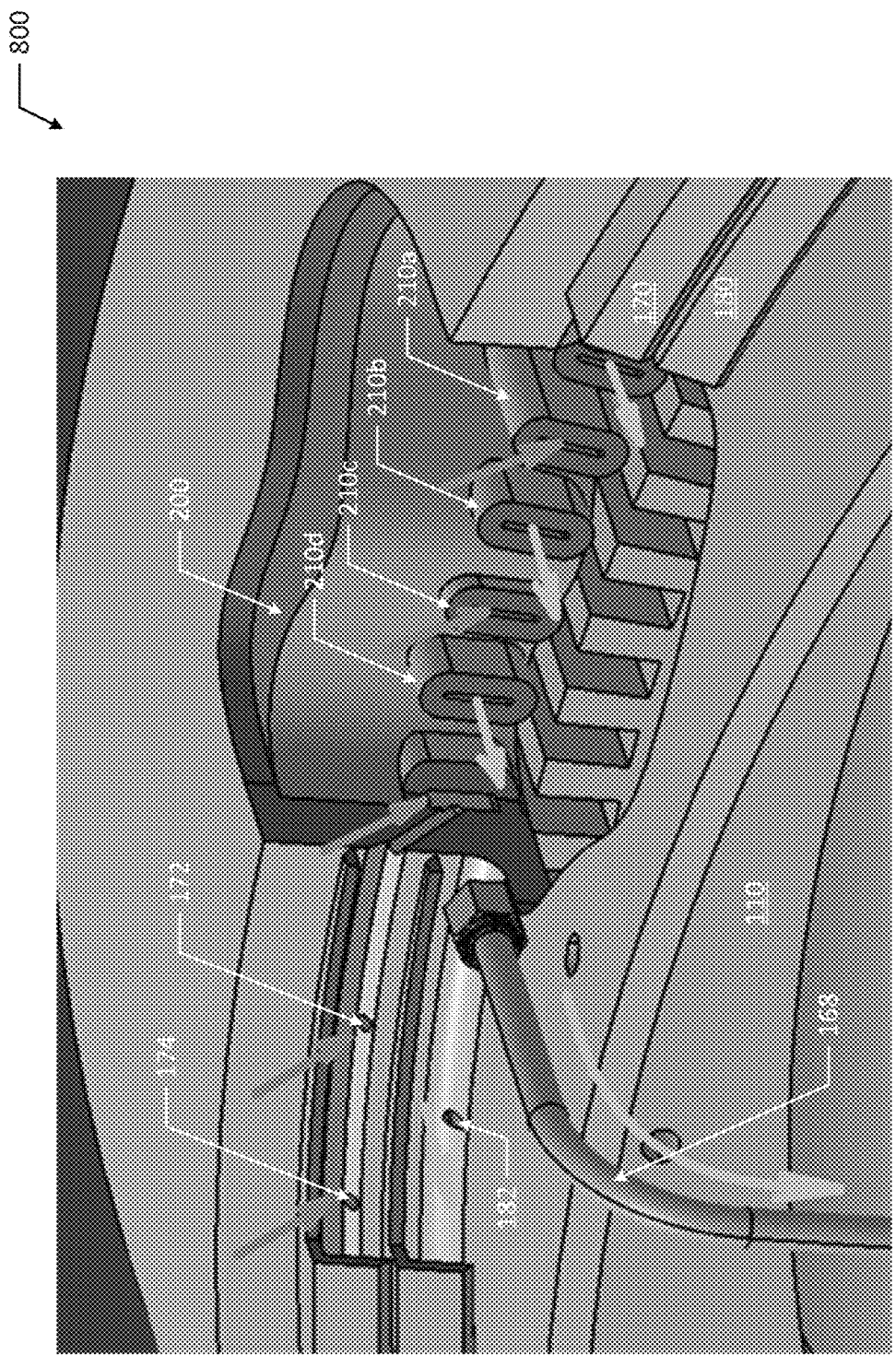
FIG. 9 illustrates another partial view of the example electric machine of FIG. 8, according to an example embodiment.

FIG. 9 illustrates another partial cross section view of the example electric machine 800, according to an example embodiment. Each of the rotor bars 210a, 210b, 210c, 210d, etc. (collectively referred to as rotor bars 210) includes a cooling channel extending axially (through the rotor) from a proximal side of the rotor to a distal side opposite the proximal side. In some examples, the cooling channels of all the rotor bars 210 are in fluid communication at the distal side of the rotor. The surface of each cooling channel inside each oval rotor bar may be as small as 0.3 square meters, for example.

As shown, the electric machine 800 includes a supply manifold 170 and a return manifold 180. Each of the manifolds 170, 180 has a circular shape and extends adjacent to an inner circumference of the rotor 200 (opposite the plurality of rotor bars 210a, 210b, 210c, 210d, etc.). For example, the manifolds 170, 180 may be machined as frontal short circuit rings. The supply manifold 170 may be connected to the tubes 162, 164 (not shown) to receive a flow of coolant from the tubes 162, 164 into the manifold 170. The return manifold 180 may be connected to tubes 166, 168 to transport flow of coolant out of the manifold 180. The manifolds 170, 180 may be covered and sealed after connecting halls 172, 174, 182. The halls 172, 174, etc. deliver coolant out of the manifold 170 into respective rotor bars 210 aligned with the halls. The hall 182 (and possibly one or more other similar halls in the manifold 180 (not shown)) transports returning or spent coolant back into manifold 180 from one or more rotor bars 210 aligned with the halls (e.g., 182) of the return manifold 180. In some examples, each rotor bar 210 aligned with a hall of the supply manifold 170 is adjacent to rotor bars that are aligned with halls of the return manifold 180. For example, rotor bar 210c may be arranged to receive coolant from the manifold 170 while adjacent rotor bars are arranged to return spent coolant into the return manifold 180. In this way, the electric machine 800 can continue cooling the rotor 200 by delivering coolant into and out of the rotor bars 210.

Figure 10:
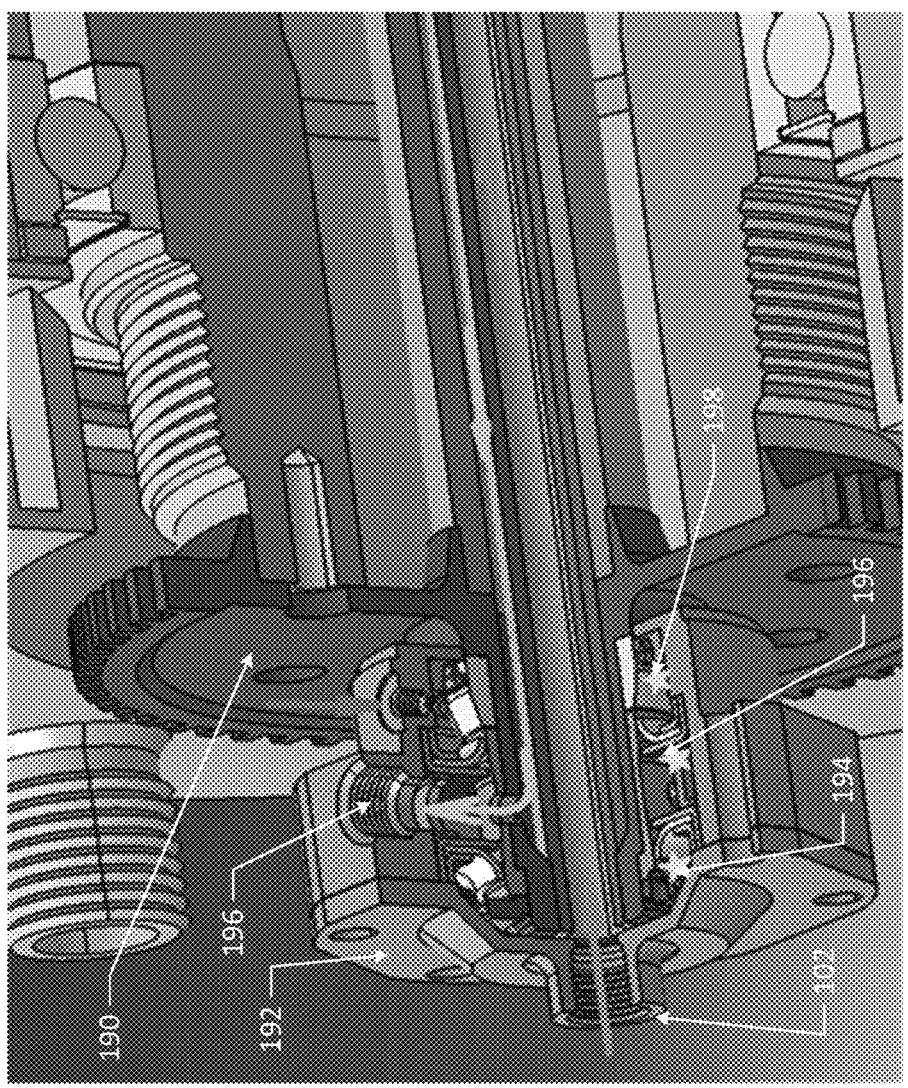
FIG. 10 illustrates yet another partial view of the example electric machine of FIG. 8, according to an example embodiment.

FIG. 10 is a partial cross section view of an alternate embodiment of an example electric machine 1000 that includes a rotor cooling system, according to an example embodiment. In the illustrated example of FIG. 10, a toothed wheel 190 (e.g., speed sensor, etc.) is mounted/machined directly onto the hollow shaft 102 at a proximal end of the hollow shaft 102 (where coolant is received by the hollow shaft 102). A shaft of the toothed wheel 190 is then adapted to receive a tube inside the hollow shaft 102. For example, the hollow tube 102 may include a supply tube and a return tube that are concentrically arranged such that the supply tube is disposed inside the return tube. In this way, the return tube can transport the spent coolant from the distal end of the shaft 102 into the shaft of the toothed wheel 190 at the proximal end of the hollow shaft 102, while the supply tube can transport coolant from the proximal end to the distal end of the hollow shaft 102 to be used for cooling the rotor 210.

In some examples, the electric machine 1000 includes a sealing device 192 that includes a cascaded arrangement of sealing chambers to reduce or mitigate dissipation of the coolant out of the shaft 102. For example, the coolant may include a combustible fluid (e.g., LNG fuel, hydrogen fuel, etc.), which may be sufficient for cooling the rotor bars 210. In this example, the cascaded sealing device 192 can reduce the likelihood of seepage of the fuel coolant during operation of the electric machine 1000.

For example, the sealing device 192 may include a top sealing chamber 194, a middle sealing chamber 196, and a bottom sealing chamber 198. Each of the sealing chambers 194, 196, 198 extends around the shaft 102 at the proximal end of the shaft. The middle sealing chamber 196 is disposed between the top and middle sealing chambers 194 and 198. The top sealing chamber 192 is configured to receive a portion of the coolant entering the hollow shaft 102 at the proximal end of the hollow shaft. The middle sealing chamber may be configured to receive the spent coolant returning to the proximal end of the hollow shaft 102 (e.g., via the shaft of the speed sensor 190, etc.). Thus, for example, a first pressure of the coolant inside the top sealing chamber 194 may be greater than a second pressure of the spent coolant inside the middle sealing chamber 196.

Further, the bottom sealing coolant 198 may be configured to receive compressed air (or other pressurized fluid). For example, the compressed air pumped into the bottom sealing coolant 198 may be pressurized by a gas turbine pump (not shown) coupled to the electric machine 1000. A pressure of the compressed air inside the bottom sealing coolant may be greater than a pressure of the spent coolant inside the middle chamber.

With this arrangement, seepage of the spent fluid out of the sealing device 192 can be reduced or mitigated because the higher pressures in the top and bottom sealing chambers 194, 198 may prevent or reduce seepage of the spent coolant inside the middle sealing chamber 196. For example, the pressure differential between the bottom and middle chambers 196, 198 may allow seepage of compressed air from the bottom chamber 198 into the middle chamber 196 more likely than seepage of the spent fluid from the middle chamber 196 into the bottom chamber 198 (and/or out of the sealing device 192), and so on.

It should be appreciated that various embodiments described herein are only examples. Alternate embodiments may include fewer, more or different components without departing from the scope of the present disclosure.

While the foregoing detailed description will provide those skilled in the art with a convenient road map for implementing various embodiments of the invention, it should be appreciated that the particular embodiments described above are only examples, and are not intended to limit the scope, applicability, or configuration of the invention in any way. To the contrary, various changes may be made in the function and arrangement of elements described without departing from the scope of the invention. As used herein, the word "exemplary" means "serving as an example, instance, or illustration." Any implementation described herein as "exemplary" is not necessarily to be construed as preferred or advantageous over other implementations, nor is it intended to be construed as a model that must be literally duplicated.

What is claimed is:

1. A stator for an electric machine, the stator comprising:
   a stator core having an annular shape and having a plurality of slots in a circumferential arrangement, each of the plurality of slots extending axially from a proximal end to a distal end of the stator core;
   a first layer of conductors;
   a second layer of conductors, wherein each conductor of the first layer and the second layer has: (i) an active part disposed inside a respective slot of the stator core, (ii) a proximal frontal part extending outside the respective slot at the proximal end of the stator core, and (iii) a distal frontal part extending outside the respective slot at the distal end of the stator core, and wherein the first layer of conductors and the second layer of conductors are connected to form a stator winding;
   power electronics integrated inside the stator and disposed between a center of the stator and the stator core, wherein the power electronics are electrically coupled to the stator winding; and
   a plurality of spokes extending radially from the center of the stator toward the stator core, wherein the power electronics are mounted to the plurality of spokes,
   wherein proximal frontal parts of the first layer of conductors have a first shape, and
   wherein proximal frontal parts of the second layer of conductors have a second shape different than the first shape.

2. The stator of claim 1, wherein a geometry of the first layer and second layer of conductors is optimized based on a given power supply frequency to minimize an alternating current (AC) resistance, wherein the AC resistance is calculated using the Dowell approach, and wherein the geometry of the of the first layer and second layer is selected using a nonlinear conjugate gradient (NGC) computation.

3. The stator of claim 1, wherein active parts of the first layer and the second layer are separated in a radial direction by a separation gap inside each of the plurality of slots.

4. The stator of claim 1, wherein each active part of the second layer disposed inside the respective slot is separated from an opening of the respective slot by a slot elongation gap.

5. The stator of claim 1, wherein a first layer thickness of the first layer of conductors is greater than a second layer thickness of the second layer of conductors.

6. The stator of claim 1, wherein, inside a given slot of the stator core, active parts of the first layer and the second layer have rectangular cross-sections and a same width.

7. The stator of claim 1, wherein a first proximal frontal part of the first layer is shaped to extend away from a first slot in a first direction, and wherein a second proximal frontal part of the second layer is shaped to extend away from the first slot in a second direction.

8. The stator of claim 1, wherein the first layer of conductors and the second layer of conductors are serially connected in an alternating order to form a continuous circuit.

9. The stator of claim 1, wherein the first layer of conductors includes a first conductor partially disposed inside a first slot of the stator core,
   wherein the second layer of conductors includes a second conductor partially disposed inside a second slot and a third conductor partially disposed inside a third slot,
   wherein a first proximal frontal part of the first conductor is connected to a second proximal frontal part of the second conductor, and
   wherein a first distal frontal part of the first conductor is connected to a second distal frontal part of the third conductor such that the third conductor, the first conductor, and the second conductor are connected in series.

10. The stator of claim 1, wherein a first conductor of the first layer of conductors is formed from a first single sheet of metal having a first sheet thickness, and wherein a second conductor of the second layer of conductors is formed from a second single sheet of metal having a second sheet thickness that is less than the first sheet thickness.

11. The stator of claim 1, wherein each active part, of the first layer and the second layer, extends lengthwise in an axial direction from a respective proximal frontal part to a respective distal frontal part.

12. The stator of claim 1, wherein each of the plurality of slots receives a first respective conductor of the first layer at a first radial position and a second respective conductor of the second layer at a second radial position.

13. The stator of claim 1, wherein the stator winding includes a first phase winding and a second phase winding, wherein the first phase winding includes a first set of one or more conductors of the first layer and one or more conductors of the second layer that are connected in series, and wherein the second phase winding includes a second set of one or more conductors of the first layer and one or more conductors of the second layer that are connected in series.

14. The stator of claim 1, wherein the stator winding includes a plurality of phase windings, wherein each phase winding corresponds to a separate continuous electrical circuit in the stator winding, and wherein each phase winding is electrically coupled to the power electronics at a different respective spoke of the plurality of spokes.

15. The stator of claim 1, further comprising:
a support structure, wherein the plurality of spokes are mounted to the support structure;
an inlet manifold mounted to the support structure, the inlet manifold including one or more inlets configured to receive a coolant; and
one or more fluid channels extending from the inlet manifold into the plurality of spokes, wherein the coolant flowing through the one or more fluid channels and inside the plurality of spokes is configured to absorb heat from the power electronics mounted to the plurality of spokes.

16. The stator of claim 15, further comprising:
a housing, wherein the stator core is disposed inside the housing;
a first cooling chamber encompassing a space between the housing and a back side of the internal stator, wherein the housing is shaped to define the first cooling chamber, and wherein the plurality of slots are arranged at a front side of the stator core opposite the back side; and
a pipe in fluid communication with the one or more fluid channels, wherein the pipe is configured to transport the coolant from the one or more fluid channels to the first cooling chamber, and wherein the coolant is configured to flow inside the first cooling chamber to absorb heat from the stator core.

17. The stator of claim 16, further comprising:
a second cooling chamber shaped to surround proximal frontal parts of the first layer and the second layer, wherein the housing is shaped to define the second cooling chamber;
a wall between the first cooling chamber and the second cooling chamber; and
a hall extending through the wall and configured to transport the coolant from the first cooling chamber into the second cooling chamber, wherein the coolant flowing inside the second cooling chamber is configured to absorb heat from the proximal frontal ends.

18. The stator of claim 17, wherein active parts of the first layer and the second layer are separated radially by respective separation gaps inside the plurality of slots, wherein the second cooling chamber is in fluid communication with the respective separation gaps and configured to transport the coolant into the respective separation gaps at the proximal end of the stator core, wherein the coolant is configured to flow through the respective separation gaps from the proximal end toward the distal end of the stator core to absorb heat from the active parts.

19. The stator of claim 18, further comprising:
a third cooling chamber shaped to surrounds distal frontal parts of the first layer and the second layer, wherein the housing is shaped to define the third cooling chamber, wherein the third cooling chamber is configured to receive the coolant flowing out of the respective separation gaps at the distal end of the stator core, and wherein the coolant is configured to flow inside the third cooling chamber to absorb heat from the distal frontal parts.

20. The stator of claim 19, further comprising:
an exit tube in fluid communication with the third cooling chamber, the exit tube configured to receive the coolant from the third cooling chamber and to transport the received coolant out of the housing.

* * * * *